C. DAM & J. E. MARKLEY.
STEEL AUTO TIRE.
APPLICATION FILED MAY 23, 1916.
1,221,694.
Patented Apr. 3, 1917.
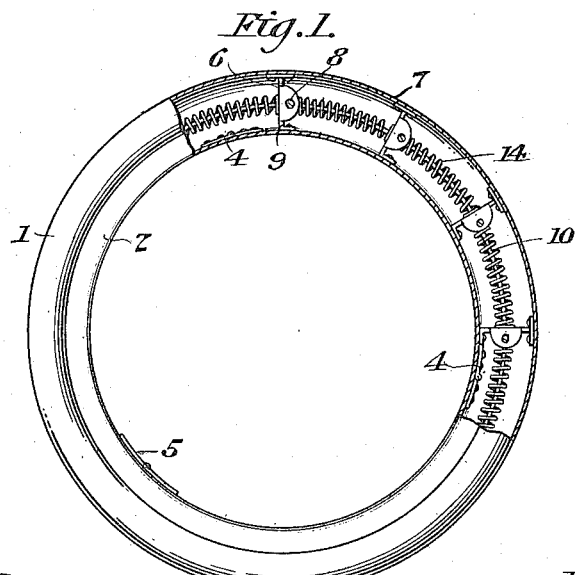
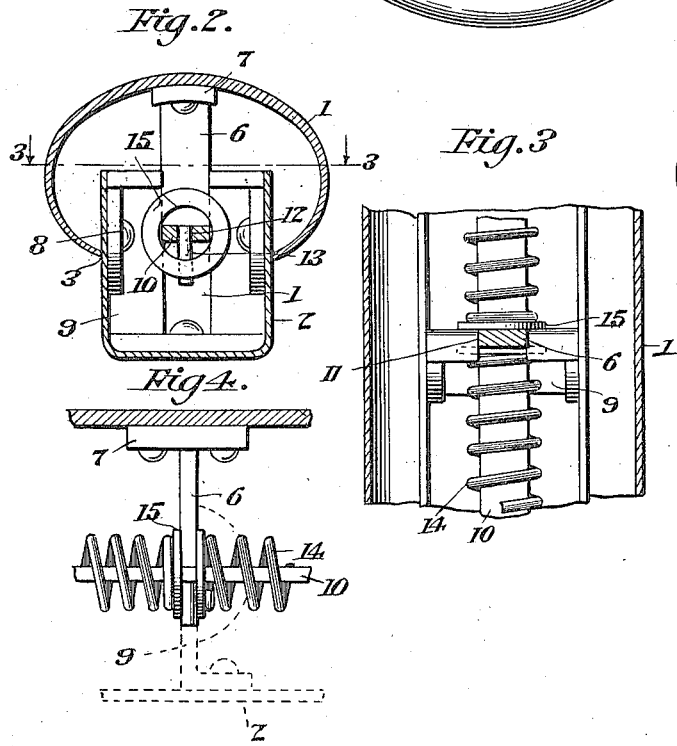
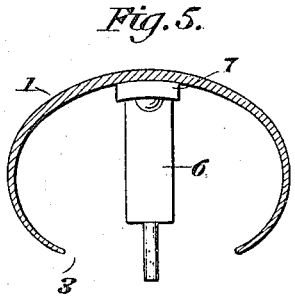
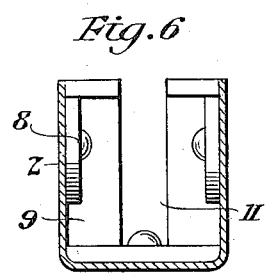
WITNESSES
INVENTORS
Chris Dam &
John E. Markley
BY Victor J. Evans
ATTORNEY

UNITED STATES PATENT OFFICE.

CHRIS DAM AND JOHN E. MARKLEY, OF GORDON, NEBRASKA.

STEEL AUTO-TIRE.

1,221,694.　　　　　Specification of Letters Patent.　　Patented Apr. 3, 1917.

Application filed May 23, 1916. Serial No. 99,370.

*To all whom it may concern:*

Be it known that we, CHRIS DAM and JOHN E. MARKLEY, citizens of the United States, residing at Gordon, in the county of Sheridan and State of Nebraska, have invented a new and useful Steel Auto-Tire, of which the following is a specification.

This invention relates to improvements in tires especially adapted for use in connection with automobiles and other vehicles.

The object of the invention is to construct a tire which shall be puncture proof and at the same time retain all of the resiliency and cushion effects of the pneumatic tire.

Another object of the invention is to produce a tire of the above character which is of simple construction, so that it will not be easily gotten out of order and one which may be manufactured at a low cost.

With the above and other objects in view the invention consists of a continuous outer tread portion, and inner sectional portions coacting therewith to form a closed casing, slidably engaging members carried by the tread and sectional portions, a ring within the said casing, and springs upon said ring between said slidably engaging portions providing a cushioning means for the tire.

In the drawings:—

Figure 1 is an elevation of a tire constructed in accordance with the present invention, a portion of the said tire being broken away to show the interior thereof;

Fig. 2 is an enlarged cross sectional view through the tire;

Fig. 3 is a detailed sectional view on the line 3—3 of Fig. 2;

Fig. 4 is an enlarged detail view illustrating the manner of mounting the cushioning springs upon the ring;

Fig. 5 is a detail sectional view of the tread portion; and

Fig. 6 is a similar view of the inner sectional portion.

Referring in detail to the drawings like characters of reference denote corresponding parts throughout the several views. As illustrated in the accompanying drawings, the tire comprises an outer continuous tread portion 1 and an inner sectional portion 2, both being preferably formed of stiff metal. The outer portion is in the form of a ring preferably of an elliptical shape in cross section and is provided with a slot 3 around its inner diameter. The inner portion 2 is formed preferably in three sections, the said sections being hinged as shown at 4, in order that they may be folded and inserted within the slot 3 of the portion 1, and are held in circular formation by means of a locking plate 5.

Secured within the said portion 1 are a plurality of inwardly projecting arms 6, the said arms being riveted or otherwise secured to the tread portion by means of ears 7. Secured within the portion 2 as shown at 8 are U-shaped members 9 the said members surrounding the arms 6 and having a sliding engagement therewith. These members are formed of a bottom flanged portion which is secured to the inner wall of the member 2, and of the side portions, which are provided with ears to receive the fastening members 8, these ears being illustrated in dotted lines in Fig. 4. The U-shaped members are each further provided with laterally extending flanges upon each side of the slots 11, the said flanges together with the slots forming guides for the inwardly projecting arms 6.

A flat ring 10 is located within the slots 11 formed by the U-shaped members, and is provided with a plurality of apertures 12 adapted for the reception of a round reduced end 13 formed upon the arms 6. The slidably engaging arms 6 and members 9 are preferably twelve in number, and located between these arms and upon the ring 10 are cushioning springs 14, the said springs bearing against washers 15 located upon each side of the arms 6. The movement of the member 1 due to the weight of the vehicle, will cause the said member to assume an eccentric position with respect to the member 2, thus compressing the springs 14 upon the opposite sides of the tire.

In order to provide a free sliding engagement between the portions 1 and 2, the portion 2 is U-shaped, and is of such a width that the straight sides are of approximately the same width as the opening 3.

From the foregoing it will be seen that weight upon the tread portion 1 will cause the said tread to slide inwardly upon the portion 2, this action being resisted by the springs 14 so that cushioning effect is produced.

It is believed that the construction and operation of the invention will be perfectly clear from the foregoing description and that further explanation of the invention will not be necessary.

Having described the invention, what is claimed is;

1. A tire comprising a casing and including a continuous tread portion, an inner sectional portion, slidably engaging members located within said tread and sectional portions, a ring within said casing and longitudinally arranged springs encircling said ring and positioned between said slidably engaging members.

2. A tire comprising a casing and including a continuous tread portion, an inner sectional portion, transversely arranged slidably engaging members secured to the side walls of the inner sectional portion and to the inner wall of the tread portion and cushioning springs within said casing.

3. A tire comprising a casing and including outer and inner slidably engaging portions, slidably engaging members located within the said casing, a ring also within said casing, said ring passing through the slidably engaging members and cushioning springs arranged upon said ring and abutting the slidably engaging members.

CHRIS DAM.
JOHN E. MARKLEY.

Witnesses:
M. G. HOWARD,
RALPH A. BAKER.

Copies of this patent may be obtained for five cents each, by addressing the "Commissioner of Patents, Washington, D. C."